May 29, 1956     E. L. CEDERQUIST     2,747,638
BOLT WITH LOCKING AND RETAINING MEANS
Original Filed Dec. 23, 1950
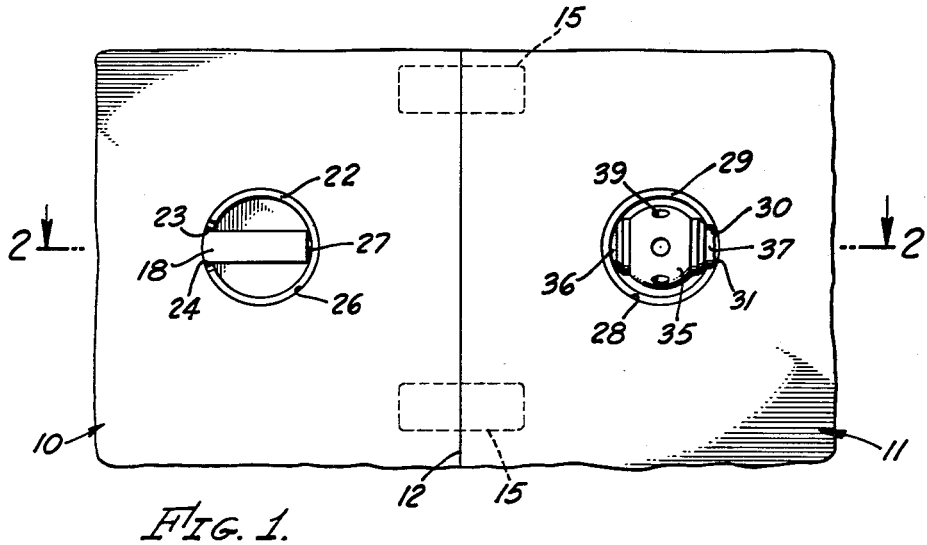
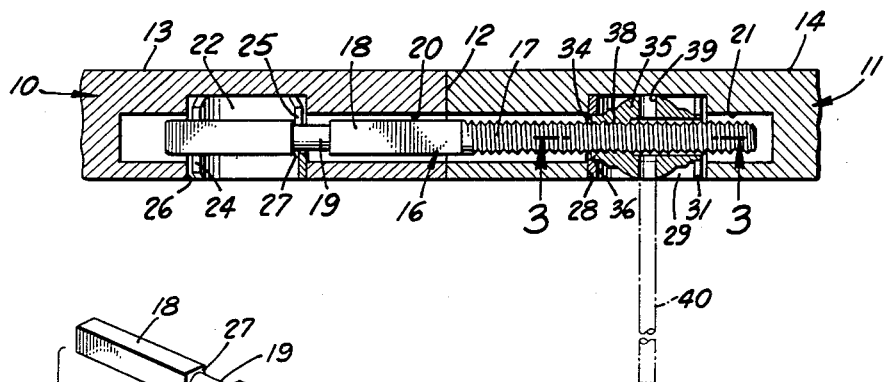
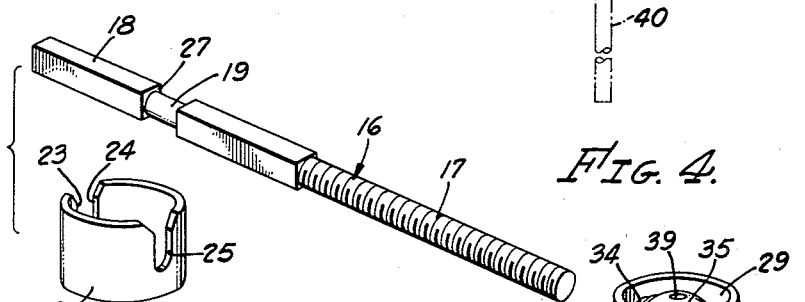
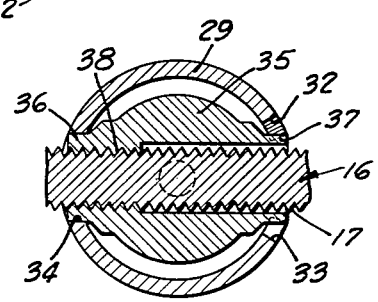
INVENTOR.
EMANUEL L. CEDERQUIST

United States Patent Office 2,747,638
Patented May 29, 1956

2,747,638

BOLT WITH LOCKING AND RETAINING MEANS

Emanuel L. Cederquist, Los Angeles, Calif.

Original application December 23, 1950, Serial No. 202,509, now Patent No. 2,648,248, dated August 11, 1953. Divided and this application June 15, 1953, Serial No. 361,513

2 Claims. (Cl. 151—61)

This invention relates to a bolt and check and may be regarded as an improvement over the constructions disclosed in my application Serial No. 57,644, filed November 1, 1948, and now abandoned. The application is a division of my application Serial No. 202,509, filed December 23, 1950, now Patent No. 2,648,248, issued August 11, 1953.

The primary purpose of the construtcion herein disclosed is to provide a means that can be easily and quickly installed in two planar members, and which will tighten and hold the planar members in abutting relationship. In the installation of counters, wall cases, wainscoting and the like, sections thereof may be completely constructed and finished at a plant or factory and transported as sections to the locality of installation. It is then desirable to fasten and tighten the end edges of such constructions in abutting relationship.

Specifically, an object of the present invention is to provide an improved joint tightener and fastener which is so designed and constructed that the parts thereof can be easily formed on punch presses, automatic screw machines, and the like which will enable the elements of the tightener and fastener to be very easily and economically manufactured and assembled. At the same time the device is so designed as to afford adequate bearing surfaces, it being understood that these tighteners and fasteners are usually installed in wooden constructions.

With the foregoing and other objects in view, which will be made manifest in the following detailed description and specifically pointed out in the appended claims, reference is had to the accompanying drawing for an illustrative embodiment of the invention wherein:

Figure 1 is a partial view of the rear side of two planar members joined together by a joint tightener and fastener embodying the present invention;

Fig. 2 is a horizontal section taken substantially upon the line 2—2 upon Fig. 1;

Fig. 3 is a sectional view taken substantially upon the line 3—3 upon Fig. 2; and Fig. 4 is an exploded view in perspective of the elements embodying the present invention.

Referring to the accompanying drawings wherein similar reference characters designate similar parts throughout, 10 and 11 indicate two planar members that are to be joined together in abutting relationship at their opposed end edges 12. These planar members may be parts of counters, wall cases, wainscoting, or similar structures, and which may have their forward faces indicated at 13 and 14 completely finished prior to the time of installation. It is desirable to connect the members 10 and 11 in abutting relationship without marring or defacing the finished forward faces 13 and 14. The members 10 and 11 may or may not be equipped with dowel pins 15 in their edges 12.

The improved joint tightener and fastener consists of a bolt generally indicated at 16, one end of which is threaded as indicated at 17 for approximately one-half the length of the bolt. The other half of the bolt is non-circular in form as indicated at 18 except for a relatively narrow neck 19 which may be cylindrical. The bolt used may be formed from square steel stock and the neck 19 as well as the threads 17 may be cut thereon on an automatic screw machine, thus enabling the bolt to be easily and economically manufactured. The ends of the bolt are receivable in holes 20 and 21 drilled into the edges of the planar members 10 and 11. These holes are drilled to such a depth that their combined depths exceeds the length of the bolt 16.

The non-circular end of the bolt is adapted to be locked in position in its hole 20 by means of a cylindrical key or check 22. This check is formed of sheet metal stamped and formed or rolled into cylindrical form. It has spaced ends 23 and 24 which are spaced from each other a distance substantially equal to the width of the non-circular portion 18. Diametrically opposite the space between these spaced ends the key or check is recessed as at 25, the width of the recess being substantially equal to the diameter of the cylindrical portion 19. This key or check is adapted to be recessed in the rear face of the planar member 10 by drilling a hole 26 in the rear face and which does not extend through to the forward face 13. The hole 26 has a diameter approximately equal to the external diameter of the key or check. When the bolt 16 is installed in the hole 20, the check can be slipped laterally with respect thereto in the hole 26. The recess 25 accommodates the circular portion 19 and the inner face of the check adjacent the recess 25 is adapted to abut against the shoulder 27. The opposed ends 23 and 24 fit snugly against the sides of the squared ends of the bolt and hold the bolt against rotation. As the cylindrical check fits the hole 26 rather closely, the ends 23 and 24 will not spread or permit rotation of the bolt 16 even though a high torque is applied thereto.

In the rear face of the other planar member 11 there is drilled a similar hole 28. This is designed to receive a cylindrical nut holder 29. The nut holder 29 is likewise formed of sheet metal stamped and bent into cylindrical form and has opposed spaced ends 30 and 31 which are notched as at 32 and 33, respectively. Diametrically opposite the space between these spaced ends there is an aperture 34. A nut 35 has protuberances constituting trunnions 36 and 37 on the ends thereof concentrically arranged with respect to the bore through the nut. The trunnion 36 is adapted to be inserted in the aperture 34 and the trunnion 37 is adapted to be sprung between the ends 30 and 31 to assume a position in the notches 32 and 33. In this manner, the nut and nut holder can be easily and quickly assembled together and the nut will be rotatably mounted in the nut holder.

The nut has the bore therethrough only partially threaded as indicated at 38, the remainder of the bore being enlarged. The threads in the nut are complementary to the threads on the threaded end 17 of the bolt. Radial holes 39 are drilled in the nut, there preferably being six of such holes circumferentially spaced thereabout. Each of these holes is capable of receiving a small section of drill rod or the equivalent indicated at 40 enabling the nut to be forcibly rotated or turned on the bolt.

It will be appreciated from the above-described constructions that the nut itself may be produced as an automatic screw machine product except for the holes 39. These holes may be simultaneously drilled in the nut on a radial drill and as their inner ends terminate opposite the enlarged portion of the bore through the nut, it is not necessary to remove therefrom any burr that might be formed on the interior of the nut as a result of this drilling. The nut holder, like the key or check, can be formed readily from sheet metal stock automatically on a punch press and the assembly of the nut with the nut holder is very easily and quickly accomplished.

In installing the joint tightener and fastener the holes 20 and 21 are drilled in the planar members and the holes 26 and 28 are drilled in the rear faces thereof. The nut holder is first slipped into the hole 28 and the bolt is started in the nut. The non-circular portion of the bolt is then positioned in the hole 20 and the key or check 22 inserted in the hole 26, thus locking this end of the bolt against rotation and against withdrawal from the hole 20. The drill rod 40 may then be applied in the holes 39 of the nut and the nut rotated so as to screw onto the bolt, thus drawing the planar members 10 and 11 into tight abutting relationship. Although a considerable tension may be thus developed on the bolt to hold the planar members in tight abutment due to the relatively broad bearing surfaces afforded by the nut holder and by the check substantially fitting in their respective holes 26 and 28 the wood of the planar members will ordinarily not be deformed or partially destroyed even though the nut is screwed up on the bolt with considerable effort.

From the above-described construction it will be appreciated that the improved joint tightener and fastener is so designed that its nut and its bolt can be easily and economically manufactured as automatic screw machine products. The check and nut holder can be readily produced on a punch press and the assembly of the nut with the nut holder is highly facilitated. These parts, when assembled together, will not readily separate and become lost from each other.

Various changes may be made in the details of construction without departing from the spirit and scope of the invention as defined by the appended claims.

I claim:

1. In a device of the class described, a bolt threaded at one end and having a square cross-sectional configuration adjacent the other except for a short reduced cylindrical neck, a cyindrical check laterally applied to said other end having a recess in the side edge thereof in which the reduced cylindrical neck is disposed, the sides of the recess being spaced from each other a distance greater than the diameter of the reduced cylindrical neck to enable the neck to be received therebetween but less than the thickness of the square end so as to prevent the squared portion from passing axially therebetween, said check having opposed parallel edges arranged diametrically opposite the recess bearing against sides of the squared portion, the spacing of the end edges being but slightly greater than the thickness of the squared portion so as to permit the squared portion to slide laterally therebetween but being insufficient to permit the squared portion to rotate therebetween.

2. In a device of the class described, a bolt threaded at one end and having a non-circular cross-sectional configuration presenting parallel sides adjacent the other end except at a reduced neck disposed inwardly of said other end, and a cylindrical check laterally applied to said other end, said check having a recess extending inwardly from a side edge thereof receivable over the reduced neck but which is narrower than the non-circular portion so that the non-circular portion cannot be drawn axially therethrough, said check having spaced parallel edges arranged diametrically opposite the recess, said edges being spaced approximately equal to the spacing between the parallel sides of the bolt to hold the bolt against rotation.

References Cited in the file of this patent

UNITED STATES PATENTS

| | | |
|---|---|---|
| 43,057 | Wells | June 7, 1864 |
| 147,659 | Leduc | Feb. 17, 1874 |
| 1,822,657 | Horton | Sept. 8, 1931 |
| 2,642,109 | Hollerith | June 16, 1953 |

FOREIGN PATENTS

| | | |
|---|---|---|
| 18,353 | Great Britain | Sept. 1, 1908 |
| 133,203 | Great Britain | Oct. 9, 1919 |
| 229,386 | Switzerland | Jan. 17, 1944 |